US012769945B2

(12) United States Patent
Sharpe et al.

(10) Patent No.: US 12,769,945 B2
(45) Date of Patent: Oct. 20, 2026

(54) SYSTEMS AND METHODS FOR CLASSIFYING TOKEN SEQUENCE EMBEDDINGS

(71) Applicant: Capital One Services, LLC, McLean, VA (US)

(72) Inventors: Samuel Sharpe, Cambridge, MA (US); Brian Barr, Schenectady, NY (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 185 days.

(21) Appl. No.: 18/581,556

(22) Filed: Feb. 20, 2024

(65) Prior Publication Data

US 2025/0265414 A1 Aug. 21, 2025

(51) Int. Cl.
*G06F 40/284* (2020.01)
*G06N 20/00* (2019.01)

(52) U.S. Cl.
CPC .......... *G06F 40/284* (2020.01); *G06N 20/00* (2019.01)

(58) Field of Classification Search
None
See application file for complete search history.

(56) References Cited

U.S. PATENT DOCUMENTS

2002/0174095 A1* 11/2002 Lulich .................. G06F 16/954
2018/0011919 A1* 1/2018 Warren .................. G06F 16/93
2018/0032897 A1* 2/2018 Cao ...................... G06N 20/10
2018/0121444 A1* 5/2018 Bao ...................... G06F 16/3322
2023/0385180 A1* 11/2023 Yannam .............. G06F 11/3688
2024/0203003 A1* 6/2024 Bera ...................... G06T 11/60
2025/0173519 A1* 5/2025 Chiang ................ G06F 16/383

OTHER PUBLICATIONS

Park et al. "A simple and fast algorithm for K-medoids clustering" (Year: 2009).*
Song et al., "A Fast Clustering-Based Feature Subset Selection Algorithm for High-Dimensional Data" (Year: 2011).*
Ran et al., "VLCP: A High-Performance FPGA-based CNN Accelerator with Vector-level Cluster Pruning" (Year: 2023).*

* cited by examiner

*Primary Examiner* — Paras D Shah
*Assistant Examiner* — Jacob B Vogt
(74) *Attorney, Agent, or Firm* — Foley & Lardner LLP

(57) ABSTRACT

Systems and methods for classifying token sequences using clustering. In some aspects, the system receives a first set of input sequences and generates a corresponding first plurality of embeddings using a first machine learning model. The system generate a plurality of clusters, each containing embeddings, using a clustering model. For each cluster in the plurality of clusters, the system generates a set of common components in the cluster. The system generates a set of universal components based on the plurality of clusters. For each cluster in the plurality of clusters, the system generates a set of unique components by removing the set of universal components from its associated set of common components. The system classifies a second plurality of embeddings using the sets of unique components.

18 Claims, 4 Drawing Sheets

SYSTEMS AND METHODS FOR CLASSIFYING TOKEN SEQUENCE EMBEDDINGS

BACKGROUND

Explainable artificial intelligence is especially difficult to achieve with token sequence data, due to the opacity of the data generation process, the often context-dependent specific syntax, and the nature of sequence data depending on both the order and the content of tokens to be fully defined. Conventional approaches to explainable artificial intelligence, which rely on straightforward relationships between features and outputs of a machine learning model, therefore, break down in the face of processing sequence data, especially when such sequence data is transformed into a different format, such as real-valued embeddings.

SUMMARY

Systems and methods described herein cure the shortcomings of conventional explainability methods and achieve accurate classification groupings that allow comparison and understanding of token sequence data. To achieve this, the systems and methods introduce additional technical steps beyond that practiced by conventional approaches to explainable artificial intelligence. By using these additional technical steps, the systems and methods are no longer beholden to only the straightforward relationships between features and outputs to determine the context-dependent specific syntax of token sequence data.

For example, conventional approaches to explainable artificial intelligence such as feature importance analysis involve iterating through each layer of a network identifying, in a linear manner, which features or inputs have the most significant impact on the output to the next layer in the network. Using this linear method, techniques like feature importance scores (e.g., using methods like permutation importance, SHAP values, or LIME) can quantify the influence of each feature on the model's predictions based on iterating through all the potential series of connections. This helps in understanding which features are more influential in determining the output.

Instead of this linear approach, the systems and methods apply a non-linear transformation. For example, the system generates clusters based on similarity. Notably, conventional token sequence data is not formatted for this non-linear clustering, so the system first translating text token sequences into embeddings, which may be compared, non-linearly, for similarities.

Based on the similarities, the system may find common components of embeddings within each cluster as well as identify unique components in each cluster. These common and unique components may now be processed (e.g., in a linear fashion) to define interpretability and accuracy of classification of the clusters. The system may then apply this interpretability and accuracy to the token sequence data corresponding to each cluster. By doing so, the system may detect additional relationships between features and outputs beyond those straightforward relationships detected in conventional systems. The benefits of doing so include adding clarity to complex and opaque token sequence data using embeddings, leading to better model performance and predictive outcomes based on such token sequence data.

In some aspects, methods and systems are described herein comprising: receiving a first set of input sequences; using a first machine learning model, generating a first plurality of embeddings corresponding to the first set of input sequences, wherein the first machine learning model translates sequences of text tokens into embeddings, wherein embeddings are vectors of real values; using a clustering model, generating a plurality of clusters, each cluster comprising one or more embeddings in the first plurality of embeddings; for each cluster in the plurality of clusters, generating a set of common components in the cluster, wherein each common component in the set of common components comprises one or more real value segments that constitute embeddings in the cluster; generating a set of universal components based on the plurality of clusters, wherein each universal component in the set of universal components comprises one or more real value segments and wherein each universal component in the set of universal components occurs in a majority of the plurality of clusters; generating, for each cluster in the plurality of clusters, a set of unique components by modifying its associated set of common components, comprising removing the set of universal components from its associated set of common components; and using the sets of unique components, classifying a second plurality of embeddings.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

The systems and methods described herein relate to generating explainability using unique components for each cluster of embeddings in a plurality of embeddings. For example, a machine learning model encodes text token sequences, such as sentences or paragraphs, to embeddings, vectors of real values corresponding to the text token sequences. A sequence of text tokens refers to a vector, in which each element is a word or alphanumeric string, processed to such a format as suitable for input into a software program. A text token in a sequence of text tokens may represent a word, phrase, punctuation mark or other textual component of a communication. To provide transparency on the meaning of embeddings and the propensities of the machine learning model to classify certain text tokens to similar embeddings, the system may use a clustering model to generate clusters of the embeddings. Each cluster is such that embeddings within the cluster are similar to other members of the cluster and dis-similar to nonmembers of the cluster. The system may then identify common components for each cluster, where the common components of a cluster occur most frequently in the cluster. Additionally, the system identifies universal components common across all clusters. By removing the universal components from each set of common components, the system generates sets of unique components for each cluster. The unique components, by capturing the patterns distinctive of a cluster, identify the special characteristics of a cluster that distinguish it from other clusters. Using the set of unique components, the system may assign embeddings to classifications based on similarity to unique components of clusters.

Figure 1:
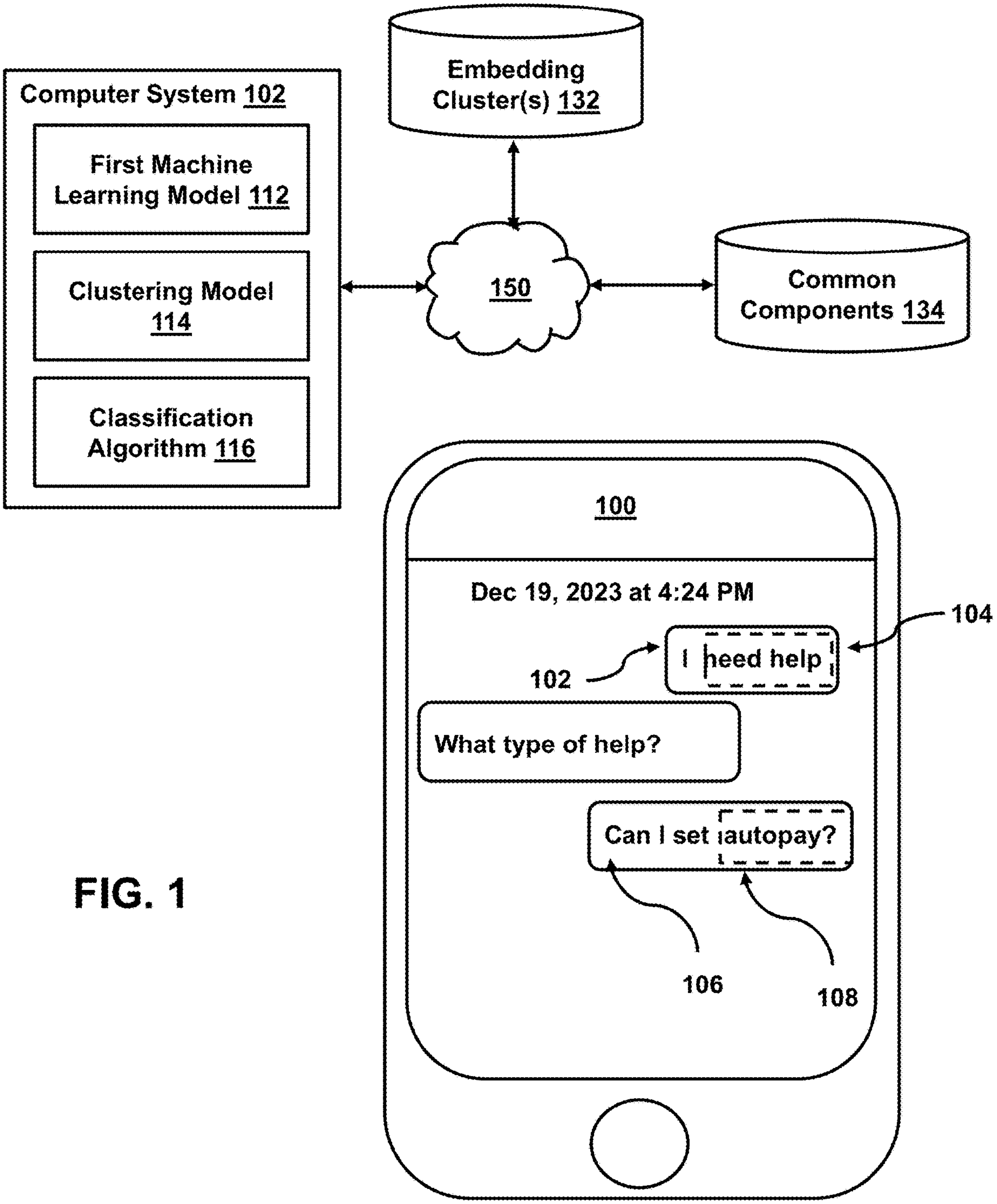
FIG. 1 shows an illustrative diagram for a system for classifying token sequence embeddings and a user interface demonstrating communications with a user, in accordance with one or more embodiments.

FIG. 1 shows User Interface 100, demonstrating the system receiving a user communication and generating a response. For example, a user may use a mobile application to transmit Communication 102 to the system. Communication 102 may be a request phrased as "I need help". In some embodiments, the system may set a time frame (e.g., a temporal element) for a response, the temporal element being a number of minutes during which the system is to deliver a first response to Communication 102. The system may extract Token Sequence 104 from Communication 102. Token Sequence 104 contains a first token (e.g., "need") and a second token (e.g., "help"), both of which the system may translate into embeddings. The system may process the embedding for Token Sequence 104 as a single entity instead of embedding each token separately, taking into consideration the context of Communication 102. Using one or more processes described below to process the embeddings, the system may generate a response to Communication 102. The response may, for example, be "What type of help?" displayed in the user interface to request further information from the user. In some embodiments, the user may send a further communication, e.g., Communication 106. Communication 106 may contain Token Sequence 108. In this example, Token Sequence 108 is of length 1, containing only the token "autopay". The system may process Token Sequence 108 to generate an embedding and use the embedding to generate an appropriate response to Communication 106.

FIG. 1 also shows an illustrative diagram for system 150, which contains hardware and software components used to classify token sequence embeddings based on clusters of unique components of embeddings, in accordance with one or more embodiments. For example, Computer System 102, a part of system 150, may include First Machine Learning Model 112, Clustering Model 114, and Classification Algorithm 116. Additionally, system 150 may create, store, and retrieve Embedding Cluster(s) 132 and/or Common Components 134.

The system (e.g., system 150) may be deployed to support a conversational program, for example a chatbot designed to receive and respond to queries regarding resource access requests and/or user accounts. For example, the system may receive user communications from mobile applications or other sources, the user communications including one or more questions or statements that may seek information. In some embodiments, the user may expect a response in real time, or within a specified timeframe. User communications may be divided into first data and second data, the first data being background information to set up basic context for the conversation, and the second data being specific information forming the query that requires a response. Background information, as referred to herein, may refer to information not directly comprising the inquiry of the user communication. For example, the text tokens making up the request or inquiry may be considered second data of a user communication, and all other text tokens may be considered first data. Both the first data and the second data may be transmitted as sentences of text from the user and may be interpreted as sequences of text tokens. The system may, for example, use embeddings of the first data to provide the model with background knowledge and contextual information. Using the embeddings, the system may achieve a superior understanding of the second data, and therefore provide more targeted and salient responses to the user's query.

To generate embeddings corresponding to text token sequences, the system may receive, retrieve or train a machine learning model (e.g., First Machine Learning Model 112). First Machine Learning Model 112 may be a language processing model trained to process sequences of text tokens into embeddings, which are real-valued vectors corresponding to token sequences. For example, a sequence of text tokens may correspond to a sentence, a paragraph or some other organization of text comprised of words of alphanumeric characters and/or punctuation. The sequence of text tokens may be in the format of each word in the sentence or paragraph represented as one token, and the tokens are arranged in the same order as they appear in the sentence or paragraph. First Machine Learning Model 112 may, for example, be trained to process sequences of text tokens corresponding to inquiries from users, to which First Machine Learning Model 112 gives responses of text. First Machine Learning Model 112 may do so by translating input token sequences into embeddings and correlating the embeddings to desired output patterns. First Machine Learning Model 112 may, for example, use a transformer algorithm to translate token sequences into embeddings, and the parameters for the transformer algorithm may be generated as the result of a training process. First Machine Learning Model 112 may alternatively be a deep learning machine learning model, using a neural network to correlate text tokens with real values. The system may train First Machine Learning Model 112 on a corpus of text data using supervised and/or unsupervised learning techniques. After training, First Machine Learning Model 112 can process input text tokens to generate embeddings corresponding to the input text tokens. In some embodiments, text tokens may be informed by context and thus may correspond to different embeddings under different circumstances, for example based on the sentence it was placed in.

First Machine Learning Model 112 may generate a plurality of embeddings corresponding to input token sequences. In some embodiments where the system processes user communications indicating queries, the system may generate embeddings based on first data in the user communication. The system may process raw text received from the user into the format of text token sequences. To do so, the system may use a data cleansing process on the raw text, including removing punctuation symbols, standardizing the format of words into text token syntax, and choosing components for each text token sequence along sentence break points. The system may then use the embedding function of First Machine Learning Model 112 to generate an embedding for each token sequence in the user communication. For example, the system may extract an embedding map from First Machine Learning Model 112, and use the embedding map to translate text token sequences to embeddings. Each embedding is a vector of real values, the vector being of the same length as the sentence or phrase corresponding to the embedding. For example, each word being embedded by First Machine Learning Model 112 corresponds to one real value in the embedding. Being vectors of real values, the embeddings may be represented in multidimensional space. The system may be interested in comparing similarities between embeddings, since the mechanism by which First Machine Learning Model 112 translates text tokens into embeddings is opaque and embeddings are not inherently interpretable. By grouping similar embeddings and identifying commonalities, the system may achieve some understanding of what embeddings symbolize and attain some insight into the reasoning of First Machine Learning Model 112 regarding what it considers to be distinctive features for each text token sequence that differentiate its embedding from other embeddings. To that end, the system may generate clusters based on the set of embeddings and use the clusters to identify common components in each cluster.

The system may use a Clustering Model (e.g., Clustering Model 114) to generate a plurality of clusters (e.g., Embedding Cluster(s) 132) based on the embeddings. Clustering Model 114 may be trained to group similar elements into the same cluster, and dis-similar elements into distant clusters such that each cluster in its output plurality of clusters has common elements within itself but is different from the elements of other clusters. Clustering Model 114 may use an algorithm such as a sequential pattern mining algorithm, a sequential pattern discovery algorithm using equivalence classes, a prefix-based tree sequence mining algorithm, a similarity-based hierarchical Clustering Model, an affinity propagation Clustering Model, or a K-means Clustering Model. Clustering Model 114 may, for example, determine distances from each embedding to other embeddings by calculating a mathematical difference between the real-valued vectors defining the respective embeddings. Using the calculated distances, Clustering Model 114 may apply a K-means clustering method to identify a number of clusters, each containing embeddings such that distances between different clusters are maximized but distances within each cluster is minimized. For example, Clustering Model 114 may classify the plurality of embeddings by assigning each embedding to an initial cluster centroid that minimizes a distance between the embedding and the initial cluster centroid. Clustering Model 114 may then adjust the cluster centroids such that each cluster centroid is the embedding that is most centrally distanced from other embeddings in the same cluster. Clustering Model 114 may repeat the process to generate final cluster centroids, where final cluster centroids minimize the total distance within each cluster but maximize the distance between clusters. Using similar methods in other embodiments, Clustering Model 114 arranges the plurality of embeddings into clusters.

For each cluster in Embedding Cluster(s) 132, the system may identify a set of common components (e.g., Common Components 134) corresponding to that cluster. The system may identify a set of potential components based on the cluster, including real value vectors of varying lengths, and each potential component is found in one or more embeddings in the cluster. Each potential component is a real value segment, which refers to real-valued vectors of any length found as part of any embedding in Embedding Cluster(s) 132. For example, a real value corresponding to a token in a token sequence assigned to the cluster may occur in other token sequences, and their embeddings all contain the real value representing the token. Common words may be used in multiple token sequences. The system may generate potential components for a variety of lengths to identify a collection of sub-components of embeddings found in the cluster. The system may then rank the set of potential components based on frequency of occurrence to generate a component ranking. In some embodiments, the system may compute a number of occurrences for each potential component and divide the number by the length of the potential component to account for longer components being inherently rarer. The system may select the set of common components based on the component ranking. For example, the system may use a percentile cutoff to select a portion of potential candidates that rank the highest in the component ranking. In some embodiments, the system may select the common components for a cluster to be all potential embeddings with a frequency of occurrence above an admittance threshold. The system may generate common components for each cluster in Embedding Cluster(s) 132. The common components for each cluster are the real value segments that occur most frequently in the cluster.

Using Embedding Cluster(s) 132, the system may generate a set of universal components, the set of universal components being vectors of any length found frequently as part of embeddings in the plurality of embeddings irrespective of cluster. Each universal component is also a real value segment, a real-valued vector of any length found as part of any embedding in Embedding Cluster(s) 132. For example, a certain real value may occur frequently in the plurality of embeddings, due to the corresponding text token being used frequently in the input token sequence. Note that the generation of universal components is independent from determining the common components for each cluster in Embedding Cluster(s) 132. To generate the set of universal components, the system may generate a full set of components, containing real-valued vectors of any length found in any of Embedding Cluster(s) 132. The full set of components represents the entirety of sub-components that make up the embeddings in Embedding Cluster(s) 132. The system may rank the full set of components based on frequency of occurrence to generate a full component ranking, the full component ranking representing the frequency of a component across the entirety of Embedding Cluster(s) 132. In some embodiments, the system may modify the frequency of occurrence before generating the full component ranking by dividing the frequency of occurrence for each component by the length of the component. Using the full component ranking, the system may select a percentile of components in the full set of components to be the set of universal components. For example, the system may include in the set of universal components the top 20% components by frequency of occurrence.

The system may generate a set of unique components for each cluster in Embedding Cluster(s) 132 by removing the set of universal components from the set of common components of the cluster. For example, the set of universal components may contain a first component of a length of two text tokens. For each cluster, the system may remove from its set of common components any component that is exactly those two text tokens. The system may, in some embodiments, choose not to remove components that contain but do not correspond exactly to the tokens specified in the set of universal components. For example, the system may recognize that despite some words or phrases being universally used, the context of usage within a particular cluster may still render the sequence containing the words or phrases of the universal component unique to the cluster. In such embodiments, the system may choose to only remove common components for each cluster that correspond exactly to universal components. The system may remove each member of the set of universal components from every set of common components for each cluster. The result is that the system modifies Common Components 134 to contain unique components for each cluster. The unique components may, in some embodiments, be used to assign classification labels to each cluster. For example, the system may translate the unique components into a text format, and assign a name to the cluster based on the text of its unique components. Additionally or alternatively, the system may generate an archetype embedding for each set of unique components. The archetype embedding may, for example, the embedding in the set of unique components with the least average distance to all other embeddings in the set of unique components.

Using the sets of unique components, the system (e.g., using Classification Algorithm 116) may assign classifications to a second plurality of embeddings, e.g., second data from a user communication. For example, using the context generated by the embeddings of the first data and the unique components, Classification Algorithm 116 may classify the second data. For example, the system may use First Machine Learning Model 112 to transform one or more entries in the second data to embeddings. For each embedding of the second data, Classification Algorithm 116 may classify the embedding by selecting the archetype embedding from among the archetype embeddings of Embedding Cluster(s) 132 with the least distance. The closest archetype embedding is used to assign a classification to each embedding in the second data. The system may generate a response to the user's query using the classifications of the second data, where the response is informed by the consideration of the second data in the context provided by the background of the first data.

Figure 2:
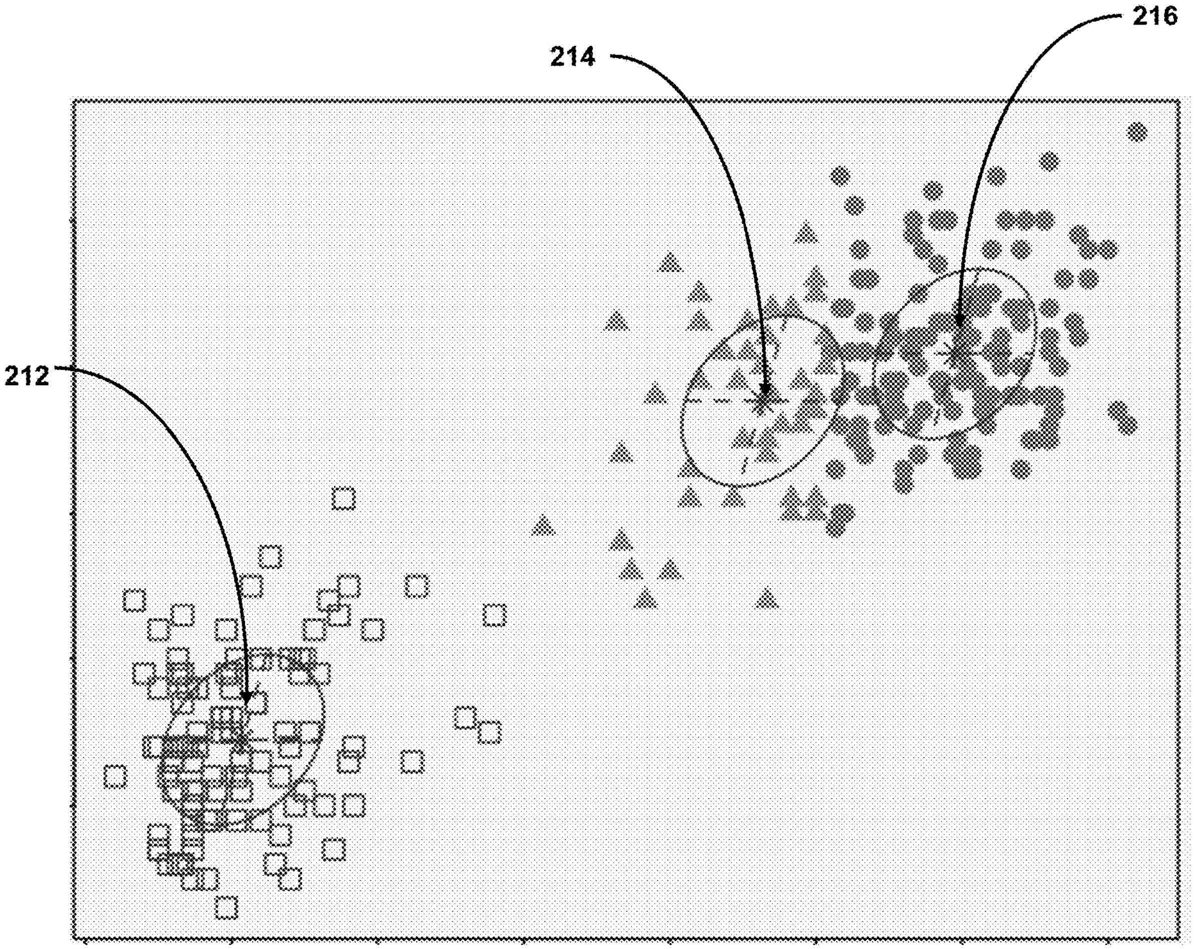
FIG. 2 show an illustration of a set of clusters of embeddings, in accordance with one or more embodiments.

FIG. 2 a set of clusters of embeddings, of the same type as described above. For example, the system may generate the embeddings using First Machine Learning Model 112. The embeddings may be real-valued vectors corresponding to text token sequences and are represented on FIG. 2 in two-dimensional space. The real values for some embeddings are more similar to particular other embeddings than other embeddings. The system may wish to identify groups of similar embeddings and adopt processes that identify unique characteristics of each group of similar embeddings. The system may use a clustering model (e.g., Clustering Model 114) to process the plurality of embeddings output by First Machine Learning Model 112. Clustering Model 114 may use a distance-based clustering algorithm, for example, and generate a set of clusters (e.g., Embedding Cluster(s) 132). Shown on FIG. 2 are three such clusters: Cluster 212, Cluster 214 and Cluster 216. Clustering Model 114 may generate the clusters by randomly assigning clustering centroids, assigning each embedding to the centroid with the least distance, and re-assigning centroids to minimize the internal distance of each cluster. By iteratively repeating the process, Clustering Model 114 may achieve minimal total distance within each cluster but maximal the distance between clusters.

The system may modify Embedding Cluster(s) 132 by, for example, removing universal components from each cluster. For example, the system may identify a set of universal components, containing components of embeddings that occur with high frequency across all embeddings. In some embodiments, the system may calculate a similarity metric for each embedding, the similarity metric indicating a degree of similarity between the embedding and the closest universal component. The system may remove an embedding from its cluster in response to the similarity metric of the embedding exceeding a threshold. The system may consequently trim certain embeddings from, for example, Cluster 212, Cluster 214 and Cluster 216.

As shown on FIG. 2, each cluster may correspond to a central point with the least average distance to other embeddings in the cluster. In some embodiments, this may be used as an archetypal embedding. Archetypal embeddings are used to classify further embeddings such as second data in user queries based on distance. The classifications assigned to second data may inform, for example, the responses for a chatbot program to the inquiries of a user.

In an example, the system may use embeddings in a downstream machine learning model to generate decision to approve or decline account state changes, for example credit applications. Often, a justification is required for approval or rejections in response to requested account state changes. In this example, a set of embeddings corresponding to a description of a user account's history was used in determining to reject a request to increase the credit limit of the user account. The system may generate an explanation for the reasons of rejection. Thus, the system may identify the classifications for the set of embeddings used by the machine learning model making the rejection decision. The classification may be text based on unique components in a cluster (e.g., Cluster 214) describing the particular characteristics of embeddings in the cluster not found within other clusters. Therefore, the classification of embeddings sheds light on the reasons for the rejection decision and may form the basis of the explanation for the reasons of rejection.

Figure 3:
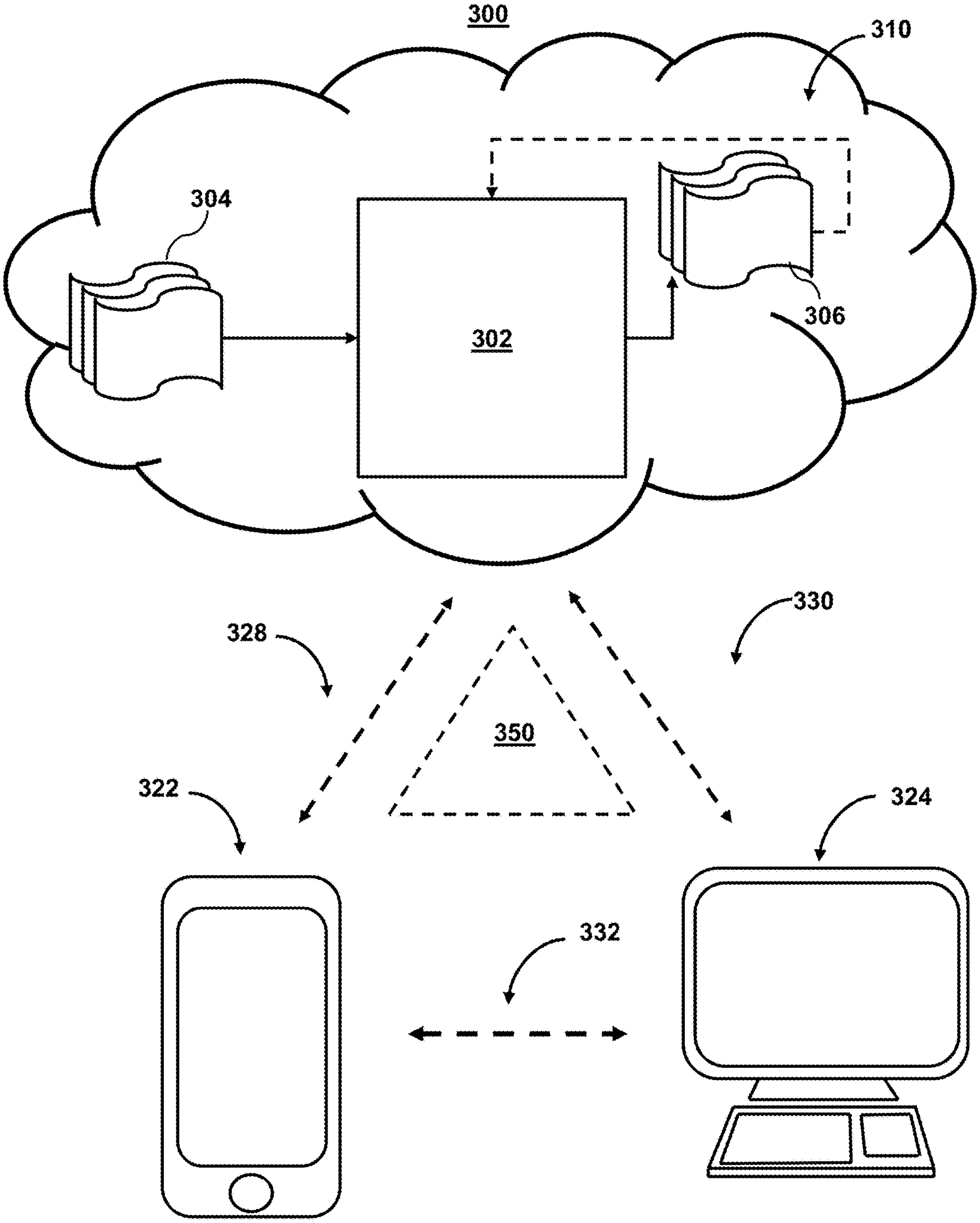
FIG. 3 shows illustrative components for a system for classifying token sequence embeddings, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the Machine learning model to classify the first labeled feature input with the known prediction (e.g., predicting resource allocation values for user systems).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., assigning embeddings to clusters).

In some embodiments, the model (e.g., model 302) may automatically perform actions based on outputs 306. In some embodiments, the model (e.g., model 302) may not perform any actions. The output of the model (e.g., model 302) may be used to generate conversational responses to user inquiries).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
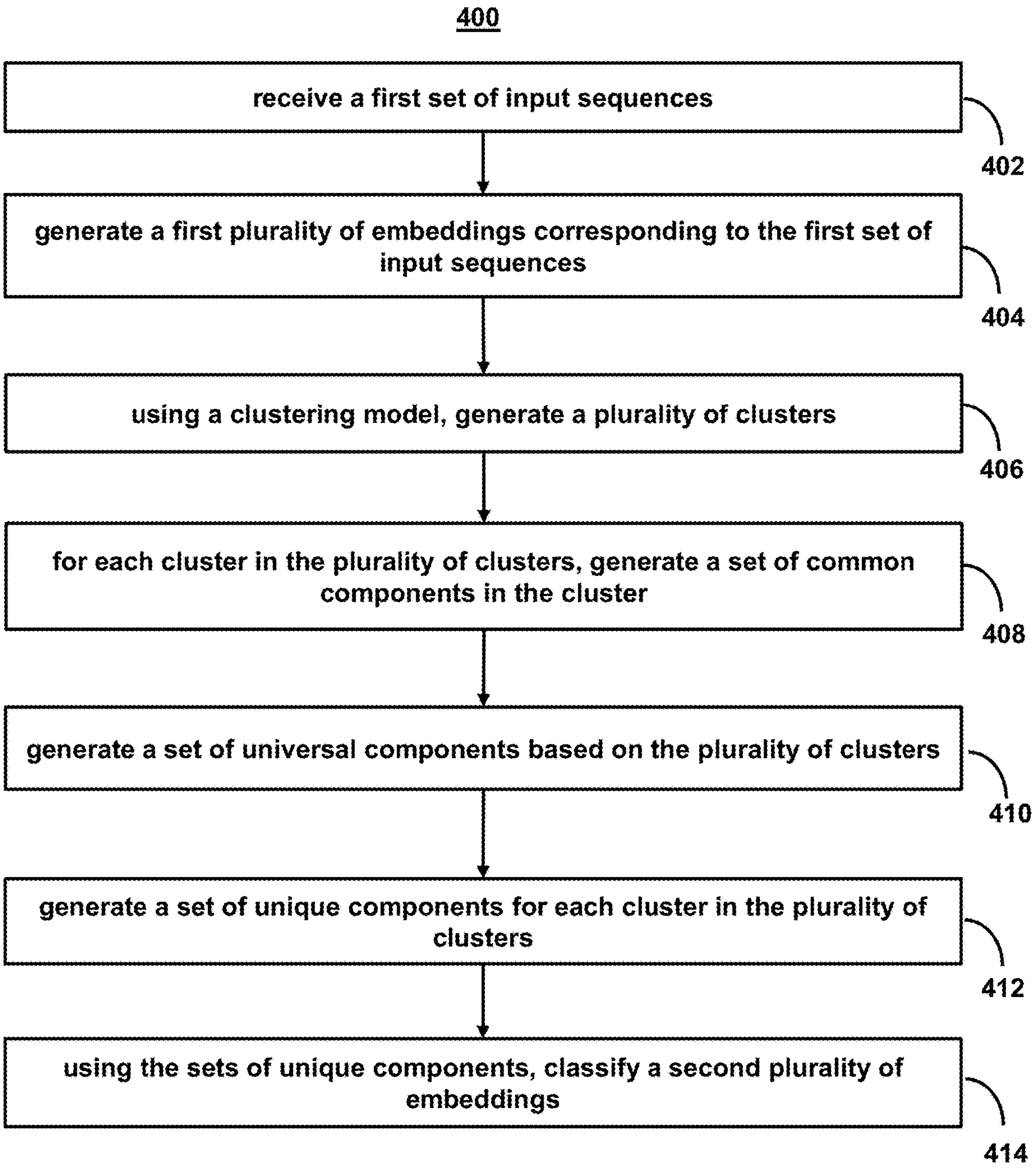
FIG. 4 shows a flowchart of the steps involved in classifying token sequence embeddings, in accordance with one or more embodiments.

FIG. 4 shows a flowchart of the steps involved in generating explainability for text embedding, in accordance with one or more embodiments. For example, the system may use process 400 (e.g., as implemented on one or more system components described above) in order to cluster embeddings, find common components and universal components, and generate sets of unique components for each cluster.

At step 402, process 400 (e.g., using one or more components described above) receives an input sequence. For example, the system may receive user communications from mobile applications or other sources, the user communications including one or more questions or statements that may seek information. In some embodiments, the user may expect a response in real time, or within a specified timeframe. User communications may be divided into first data and second data, the first data being background information to set up basic context for the conversation, and the second data being specific information forming the query that requires a response. Both the first data and the second data may be transmitted as sentences of text from the user and may be interpreted as sequences of text tokens. The system may, for example, use embeddings of the first data to provide the model with background knowledge and contextual information. Using the embeddings, the system may achieve a superior understanding of the second data, and therefore provide more targeted and salient responses to the user's query.

At step 404, process 400 (e.g., using one or more components described above) generates embeddings corresponding to the input sequence. For example, using a first machine learning model, the system may generate a first plurality of embeddings corresponding to the first set of input sequences, wherein the first machine learning model translates sequences of text tokens into embeddings, wherein embeddings are vectors of real value. To generate embeddings corresponding to text token sequences, the system may receive, retrieve or train a machine learning model (e.g., First Machine Learning Model 112). First Machine Learning Model 112 may be a language processing model trained to process sequences of text tokens into embeddings, which are real-valued vectors corresponding to token sequences. For example, a sequence of text tokens may correspond to a sentence, a paragraph or some other organization of text comprised of words of alphanumeric characters and/or punctuation. The sequence of text tokens may be in the format of each word in the sentence or paragraph represented as one token, and the tokens are arranged in the same order as they appear in the sentence or paragraph. First Machine Learning Model 112 may, for example, be trained to process sequences of text tokens corresponding to inquiries from users, to which First Machine Learning Model 112 gives responses of text. First Machine Learning Model 112 may do so by translating input token sequences into embeddings and correlating the embeddings to desired output patterns. First Machine Learning Model 112 may, for example, use a transformer algorithm to translate token sequences into embeddings, and the parameters for the transformer algorithm may be generated as the result of a training process. First Machine Learning Model 112 may alternatively be a deep learning machine learning model, using a neural network to correlate text tokens with real values. The system may train First Machine Learning Model 112 on a corpus of text data using supervised and/or unsupervised learning techniques. After training, First Machine Learning Model 112 can process input text tokens to generate embeddings corresponding to the input text tokens. In some embodiments, text tokens may be informed by context and thus may correspond to different embeddings under different circumstances, for example based on the sentence it was placed in.

First Machine Learning Model 112 may generate a plurality of embeddings corresponding to input token sequences. In some embodiments where the system processes user communications indicating queries, the system may generate embeddings based on first data in the user communication. The system may process raw text received from the user into the format of text token sequences. To do so, the system may use a data cleansing process on the raw text, including removing punctuation symbols, standardizing the format of words into text token syntax, and choosing components for each text token sequence along sentence break points. The system may then use the embedding function of First Machine Learning Model 112 to generate an embedding for each token sequence in the user communication. For example, the system may extract an embedding map from First Machine Learning Model 112, and use the embedding map to translate text token sequences to embeddings. Each embedding is a vector of real values, the vector being of the same length as the sentence or phrase corresponding to the embedding. For example, each word being embedded by First Machine Learning Model 112 corresponds to one real value in the embedding. Being vectors of real values, the embeddings may be represented in multi-dimensional space. The system may be interested in comparing similarities between embeddings, since the mechanism by which First Machine Learning Model 112 translates text tokens into embeddings is opaque and embeddings are not inherently interpretable. By grouping similar embeddings and identifying commonalities, the system may achieve some understanding of what embeddings symbolize and attain some insight into the reasoning of First Machine Learning Model 112 regarding what it considers to be distinctive features for each text token sequence that differentiate its embedding from other embeddings. To that end, the system may generate clusters based on the set of embeddings and use the clusters to identify common components in each cluster.

At step 406, process 400 (e.g., using one or more components described above) generates a plurality of clusters using a clustering model. For example, each cluster includes one or more embeddings in the first plurality of embeddings. The system may use a Clustering Model (e.g., Clustering Model 114) to generate a plurality of clusters (e.g., Embedding Cluster(s) 132) based on the embeddings. Clustering Model 114 may be trained to group similar elements into the same cluster, and dis-similar elements into distant clusters such that each cluster in its output plurality of clusters has common elements within itself but is different from the elements of other clusters. Clustering Model 114 may use an algorithm such as a sequential pattern mining algorithm, a sequential pattern discovery algorithm using equivalence classes, a prefix-based tree sequence mining algorithm, a similarity-based hierarchical Clustering Model, an affinity propagation Clustering Model, or a K-means Clustering Model. Clustering Model 114 may, for example, determine distances from each embedding to other embeddings by calculating a mathematical difference between the real-valued vectors defining the respective embeddings. Using the calculated distances, Clustering Model 114 may apply a K-means clustering method to identify a number of clusters, each containing embeddings such that distances between different clusters are maximized but distances within each cluster is minimized. For example, Clustering Model 114 may classify the plurality of embeddings by assigning each embedding to an initial cluster centroid that minimizes a distance between the embedding and the initial cluster centroid. Clustering Model 114 may then adjust the cluster centroids such that each cluster centroid is the embedding that is most centrally distanced from other embeddings in the same cluster. Clustering Model 114 may repeat the process to generate final cluster centroids, where final cluster centroids minimize the total distance within each cluster but maximize the distance between clusters. Using similar methods in other embodiments, Clustering Model 114 arranges the plurality of embeddings into clusters.

At step 408, process 400 (e.g., using one or more components described above) generates a set of common components in each cluster in the plurality of clusters. For example, each common component in the set of common components comprises one or more real value segments that constitute embeddings in the cluster. For each cluster in Embedding Cluster(s) 132, the system may identify a set of common components (e.g., Common Components 134) corresponding to that cluster. The system may identify a set of potential components based on the cluster, including real value vectors of varying lengths, and each potential component is found in one or more embeddings in the cluster. For example, a real value corresponding to a token in a token sequence assigned to the cluster may occur in other token sequences, and their embeddings all contain the real value representing the token. Common words may be used in multiple token sequences. The system may generate potential components for a variety of lengths to identify a collection of sub-components of embeddings found in the cluster. The system may then rank the set of potential components based on frequency of occurrence to generate a component ranking. In some embodiments, the system may compute a number of occurrences for each potential component and divide the number by the length of the potential component to account for longer components being inherently rarer. The system may select the set of common components based on the component ranking. For example, the system may use a percentile cutoff to select a portion of potential candidates that rank the highest in the component ranking. In some embodiments, the system may select the common components for a cluster to be all potential embeddings with a frequency of occurrence above an admittance threshold. The system may generate common components for each cluster in Embedding Cluster(s) 132.

At step 410, process 400 (e.g., using one or more components described above) generates a set of universal components based on the plurality of clusters. For example, each universal component in the set of universal components occurs in a majority of the plurality of clusters. Using Embedding Cluster(s) 132, the system may generate a set of universal components, the set of universal components being vectors of any length found frequently as part of embeddings in the plurality of embeddings irrespective of cluster. For example, a certain real value may occur frequently in the plurality of embeddings, due to the corresponding text token being used frequently in the input token sequence. Note that the generation of universal components is independent from determining the common components for each cluster in Embedding Cluster(s) 132. To generate the set of universal components, the system may generate a full set of components, containing real-valued vectors of any length found in any of Embedding Cluster(s) 132. The full set of components represents the entirety of sub-components that make up the embeddings in Embedding Cluster(s) 132. The system may rank the full set of components based on frequency of occurrence to generate a full component ranking, the full component ranking representing the frequency of a component across the entirety of Embedding Cluster(s) 132. In some embodiments, the system may modify the frequency of occurrence before generating the full component ranking by dividing the frequency of occurrence for each component by the length of the component. Using the full component ranking, the system may select a percentile of components in the full set of components to be the set of universal components. For example, the system may include in the set of universal components the top 20% components by frequency of occurrence.

At step 412, process 400 (e.g., using one or more components described above) generates a set of unique components for each cluster in the plurality of clusters. The system may do so by modifying its associated set of common components, comprising removing the set of universal components from its associated set of common components. The system may generate a set of unique components for each cluster in Embedding Cluster(s) 132 by removing the set of universal components from the set of common components of the cluster. For example, the set of universal components may contain a first component of a length of two text tokens. For each cluster, the system may remove from its set of common components any component that is exactly those two text tokens. The system may, in some embodiments, choose not to remove components that contain but do not correspond exactly to the tokens specified in the set of universal components. For example, the system may recognize that despite some words or phrases being universally used, the context of usage within a particular cluster may still render the sequence containing the words or phrases of the universal component unique to the cluster. In such embodiments, the system may choose to only remove common components for each cluster that correspond exactly to universal components. The system may remove each member of the set of universal components from every set of common components for each cluster. The result is that the system modifies Common Components 134 to contain unique components for each cluster. The unique components may, in some embodiments, be used to assign classification labels to each cluster. For example, the system may translate the unique components into a text format, and assign a name to the cluster based on the text of its unique components. Additionally or alternatively, the system may generate an archetype embedding for each set of unique components. The archetype embedding may, for example, the embedding in the set of unique components with the least average distance to all other embeddings in the set of unique components.

At step 414, process 400 (e.g., using one or more components described above) classifies a second plurality of embeddings using the sets of unique components. Using the sets of unique components, the system may assign classifications to a second plurality of embeddings, e.g., second data from a user communication. For example, using the context generated by the embeddings of the first data and the unique components, the system may classify the second data. For example, the system may use First Machine Learning Model 112 to transform one or more entries in the second data to embeddings. For each embedding of the second data, the system may classify the embedding by selecting the archetype embedding from among the archetype embeddings of Embedding Cluster(s) 132 with the least distance. The closest archetype embedding is used to assign a classification to each embedding in the second data. The system may generate a response to the user's query using the classifications of the second data, where the response is informed by the consideration of the second data in the context provided by the background of the first data.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating explainability for text embeddings when processing user communications in real-time to generate real-time responses, comprising: receiving a first user communication, wherein the first user communication comprises a request with a temporal element; detecting first data and second data in the first user communication, wherein the first data comprises background information relating to the first user communication, and wherein the second data is a query requiring a first response within the temporal element; using a first machine learning model, generating a first plurality of embeddings corresponding to a first set of input sequences in the first data, wherein the first machine learning model translates sequences of text tokens into embeddings, wherein embeddings are vectors of real values; using a clustering model, generating a plurality of clusters, each cluster comprising one or more embeddings in the first plurality of embeddings; for each cluster in the plurality of clusters, generating a set of common components in the cluster, wherein each common component in the set of common components comprises one or more real value segments that constitute embeddings in the cluster; generating a set of universal components based on the plurality of clusters, wherein each universal component in the set of universal components comprises one or more real value segments and wherein each universal component in the set of universal components occurs in a majority of the plurality of clusters; generating, for each cluster in the plurality of clusters, a set of unique components by modifying its associated set of common components, comprising removing the set of universal components from its associated set of common components; using the sets of unique components, classifying a second plurality of embeddings in the second data; and generating for display, in a user interface, the first response to the first user communication based on classifying the second plurality of embeddings, wherein the first response corresponds to the temporal element.
2. A method for generating explainability for text embeddings, comprising: receiving a first set of input sequences; using a first machine learning model, generating a first plurality of embeddings corresponding to the first set of input sequences, wherein the first machine learning model translates sequences of text tokens into embeddings, wherein embeddings are vectors of real values; using a clustering model, generating a plurality of clusters, each cluster comprising one or more embeddings in the first plurality of embeddings;

for each cluster in the plurality of clusters, generating a set of common components in the cluster, wherein each common component in the set of common components comprises one or more real value segments that constitute embeddings in the cluster; generating a set of universal components based on the plurality of clusters, wherein each universal component in the set of universal components comprises one or more real value segments and wherein each universal component in the set of universal components occurs in a majority of the plurality of clusters; generating, for each cluster in the plurality of clusters, a set of unique components by modifying its associated set of common components, comprising removing the set of universal components from its associated set of common components; and using the sets of unique components, classifying a second plurality of embeddings.

3. The method of any one of the preceding embodiments, wherein first machine learning model is a bidirectional encoder transformer representations model trained to produce textual predictions.

4. The method of any one of the preceding embodiments, wherein generating the set of common components for a cluster in the plurality of clusters comprises: identifying a set of potential components based on the cluster, wherein the set of potential components comprises real value vectors of varying lengths, and wherein each potential component in the set of potential components is found in one or more embeddings in the cluster; ranking the set of potential components based on frequency of occurrence to generate a component ranking; and selecting the set of common components from the component ranking to be a fixed number of components.

5. The method of any one of the preceding embodiments, wherein generating a set of universal components based on the plurality of clusters comprises: generating a full set of components, wherein the full set of components comprises all real-valued vectors of any length from the plurality of clusters; ranking the full set of components based on frequency of occurrence to generate a full component ranking; and selecting the set of universal components from the full component ranking to be a portion of components.

6. The method of any one of the preceding embodiments, wherein generating the plurality of clusters comprises: training the clustering model to sort vectors of real values into clusters based on distances between any two vectors of real values; and using the clustering model, generating the plurality of clusters based on the first plurality of embeddings.

7. The method of any one of the preceding embodiments, wherein the clustering model: selects a number of initial cluster centroids; generates a set of initial clusters by assigning each embedding to an initial cluster centroid that minimizes a distance between the embedding and the initial cluster centroid; calculates a number of final cluster centroids by, for each cluster in the set of initial clusters, selecting an embedding with minimal average distance to other embeddings in the cluster; and generates a set of final clusters by assigning each embedding to a final cluster centroid that minimizes the distance between the embedding and the final cluster centroid.

8. The method of any one of the preceding embodiments, wherein generating a set of unique components for a cluster in the plurality of clusters comprises: for each embedding in the cluster, generating a similarity score, wherein the similarity score indicates a degree of similarity between the embedding and a closest embedding in the set of universal components; and removing all embeddings with similarity scores above a threshold from the cluster.

9. The method of any one of the preceding embodiments, wherein each set of unique components comprises an archetype embedding, wherein the archetype embedding is a vector of real values most representative of the embeddings in the cluster corresponding to the set of unique components.

10. The method of any one of the preceding embodiments, wherein classifying the second plurality of embeddings using the sets of unique components comprises: for each embedding in the second plurality of embeddings, generating a distance metric from the embedding to each archetype embedding; and based on the archetype embedding with a shortest distance metric, assigning classifications to the second plurality of embeddings.

11. The method of any one of the preceding embodiments, further comprising: generating, for each cluster in the plurality of clusters, a component collection for the cluster, wherein the component collection comprises all subsections of real values found in embeddings in the cluster; and for each component collection, removing the set of universal components from the component collection to generate the set of unique components corresponding to the cluster.

12. The method of any one of the preceding embodiments, wherein generating the first plurality of embeddings corresponding to the first set of input sequences comprises: extracting a first embedding map from the first machine learning model, wherein the first embedding map is a relation between text and real values generated during a training process of the first machine learning model to correspond individual text tokens to real values; and for each input sequence in the first set of input sequences, using the first embedding map to generate real values corresponding to an embedding of the input sequence.

13. The method of any one of the preceding embodiments, wherein each cluster in the plurality of clusters is associated with a classification based on its set of unique components, the classification comprising a text sequence corresponding to the set of unique components.

14. One or more tangible, non-transitory, computer-readable media storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for improving model performance by reducing vector search spaces, the system comprising one or more processors and one or more non-transitory, computer-readable media comprising instructions that, when executed, cause operations comprising:

obtaining, during a communication session, first data comprising one or more first inputs and second data comprising a query;

providing a first machine learning model with the one or more first inputs to obtain an earlier plurality of embeddings and with the query to obtain a later plurality of embeddings;

clustering the earlier plurality of embeddings using a clustering model to generate clusters;

generating universal vectors by ranking real-value segments of the clusters according to occurrence frequencies, wherein each vector of the universal vectors comprises a real-value segment associated with an occurrence frequency greater than an inter-cluster threshold;

generating, for each cluster in the clusters, a set of common vectors in the cluster by selecting one or more vectors of the cluster having an intra-cluster occurrence frequency that is greater than an intra-cluster admittance threshold;

generating, for each cluster in the clusters, a set of unique vectors by removing the universal vectors from the set of common vectors;

generating a set of archetype vectors by (i) determining a set of unique vectors by removing the universal vectors from the set of common vectors and (ii) determining the set of archetype vectors based on the set of unique vectors without using vectors of the universal vectors;

generating distance metrics between the later plurality of embeddings and the set of archetype vectors;

classifying the later plurality of embeddings with a classification associated with a minimum distance of the distance metrics; and presenting, in a user interface, a target response during the communication session by generating the target response based on the classification.

2. A method for improving model performance by reducing vector search spaces, comprising:

obtaining, during one or more communication sessions, first data comprising one or more first inputs and second data comprising a query;

providing a first machine learning model with the one or more first inputs to obtain an earlier plurality of embeddings and with the query to obtain a later-a first plurality of embeddings;

clustering the earlier plurality of embeddings using a clustering model to generate clusters;

generating universal vectors by ranking real-value segments of the clusters according to occurrence frequencies, wherein each vector of the universal vectors comprises a real-value segment associated with an occurrence frequency greater than an inter-cluster threshold;

generating, for each cluster in the clusters, a set of common vectors in the cluster by selecting one or more vectors of the cluster having an intra-cluster occurrence frequency that is greater than an intra-cluster admittance threshold;

generating a set of archetype vectors by (i) determining a set of unique vectors by removing the universal vectors from the set of common vectors and (ii) determining the set of archetype vectors based on the set of unique vectors without using vectors of the universal vectors;

generating distance metrics between the later plurality of embeddings and the set of archetype vectors;

classifying the later plurality of embeddings with a classification associated with a minimum distance of the distance metrics; and presenting, in a user interface that is used during at least one session of the one or more communication sessions, a target response based on the classification.

3. The method of claim 2, wherein generating the set of common vectors comprises limiting a selection of one or more vectors associated with a first cluster of the clusters to a fixed number of vectors.

4. The method of claim 2, wherein ranking the real-value segments of the clusters results in a full vector ranking, and wherein generating the universal vectors based on the clusters comprises limiting a selection of one or more vectors associated for inclusion in the universal vectors to vectors within an upper portion of the full vector ranking defined by a portion threshold.

5. The method of claim 2, wherein clustering the earlier plurality of embeddings comprises using the clustering model to generate the clusters, further comprising training the clustering model to sort vectors of real values into clusters based on distances between any two vectors of real values.

6. The method of claim 5, wherein using the clustering model comprises:

selecting a number of initial cluster centroids;

generating a set of initial clusters by assigning each respective embedding of the earlier plurality of embeddings to an initial cluster centroid that minimizes a distance between the respective embedding and the initial cluster centroid; and calculating a number of final cluster centroids for the clusters by, for each respective cluster in the set of initial clusters, selecting an embedding with minimal average distance to other embeddings in the respective cluster.

7. The method of claim 2, wherein determining the set of unique vectors comprises:

for each respective embedding in a first cluster of the clusters, generating a similarity score, wherein the similarity score indicates a degree of similarity between the respective embedding and a closest embedding in the universal vectors; and removing, from the first cluster, all respective embeddings with similarity scores above a similarity score threshold from the first cluster.

8. The method of claim 2, further comprising determining a first archetype vector of the set of archetype vectors by determining a least average distance of a vector subset of the set of unique vectors.

9. The method of claim 2, further comprising:

generating, for a first cluster in the clusters, a vector collection for the first cluster, wherein the vector collection comprises all subsections of real values found in embeddings in the first cluster; and removing at least one vector of the universal vectors from the vector collection to generate a vector subset of the set of unique vectors corresponding to the first cluster.

10. The method of claim 2, further comprising:

extracting an embedding map from a first machine learning model, wherein the embedding map indicates one or more relations between text tokens and one or more real values; and using the embedding map to generate at least one real value corresponding to an embedding associated with an input of the one or more first inputs.

11. The method of claim 2, wherein the classification comprises a text sequence derived from at least one vector of the set of unique vectors.

12. The method of claim 2, wherein each universal vector in the universal vectors occurs in a majority of the clusters.

13. One or more non-transitory computer-readable media comprising instructions that, when executed by one or more processors, cause operations comprising:

obtaining, during one or more communication sessions, first data comprising one or more first inputs and second data comprising a query;

providing a first machine learning model with the one or more first inputs to obtain a first plurality of embeddings and with the query to obtain a second plurality of embeddings;

clustering the first plurality of embeddings using a clustering model to generate clusters;

generating universal vectors by ranking real-value segments of the clusters according to occurrence frequencies, wherein each vector of the universal vectors comprises a real-value segment associated with an occurrence frequency greater than an inter-cluster threshold;

generating, for each cluster in the clusters, a set of common vectors in the cluster by selecting one or more vectors of the cluster having an intra-cluster occurrence frequency that is greater than an intra-cluster admittance threshold;

generating a set of archetype vectors by (i) determining a set of unique vectors by removing the universal vectors from the set of common vectors and (ii) determining the set of archetype vectors based on the set of unique vectors;

without using vectors of the universal vectors;

generating distance metrics between the second plurality of embeddings and the set of archetype vectors;

classifying the second plurality of embeddings with a classification associated with a minimum distance of the distance metrics; and presenting, in a user interface that is used during at least one session of the one or more communication sessions, a target response based on the classification.

14. The one or more non-transitory computer-readable media of claim 13, wherein generating the set of common vectors comprises limiting a selection of one or more vectors associated with a first cluster of the clusters to a fixed number of vectors.

15. The one or more non-transitory computer-readable media of claim 13, wherein ranking the real-value segments of the clusters results in a full vector ranking, and wherein generating the universal vectors based on the clusters comprises limiting a selection of one or more vectors associated for inclusion in the universal vectors to vectors within an upper portion of the full vector ranking defined by a portion threshold.

16. The one or more non-transitory computer-readable media of claim 13, further comprising training the clustering model to sort vectors of real values into clusters based on distances between any two vectors of real values.

17. The one or more non-transitory computer-readable media of claim 13, wherein using the clustering model comprises:

selecting a number of initial cluster centroids;

generating a set of initial clusters by assigning each respective embedding of the first plurality of embeddings to an initial cluster centroid that minimizes a distance between the respective embedding and the initial cluster centroid; and calculating a number of final cluster centroids for the clusters by, for each respective cluster in the set of initial clusters, selecting an embedding with minimal average distance to other embeddings in the respective cluster.

18. The one or more non-transitory computer-readable media of claim 13, wherein generating the set of unique vectors comprises:

for each respective embedding in a first cluster of the clusters, generating a similarity score, wherein the similarity score indicates a degree of similarity between the respective embedding and a closest embedding in the universal vectors; and removing, from the first cluster, all respective embeddings with similarity scores above a similarity score threshold from the first cluster.

* * * * *